(12) United States Patent
Frost

(10) Patent No.: US 12,491,661 B2
(45) Date of Patent: Dec. 9, 2025

(54) COMPOSTABLE BIOPLASTIC AND METHODS OF MANUFACTURE

(71) Applicant: Mercade Frost, San Francisco, CA (US)

(72) Inventor: Mercade Frost, San Francisco, CA (US)

( * ) Notice: Subject to any disclaimer, the term of this patent is extended or adjusted under 35 U.S.C. 154(b) by 478 days.

(21) Appl. No.: 18/079,721

(22) Filed: Dec. 12, 2022

(65) Prior Publication Data

US 2023/0191661 A1 Jun. 22, 2023

Related U.S. Application Data

(60) Provisional application No. 63/353,437, filed on Jun. 17, 2022, provisional application No. 63/292,068, filed on Dec. 21, 2021.

(51) Int. Cl.

| | |
|---|---|
| *C08L 99/00* | (2006.01) |
| *B29B 7/92* | (2006.01) |
| *C08H 8/00* | (2010.01) |
| *C08L 1/02* | (2006.01) |
| *C08L 5/14* | (2006.01) |
| *C08L 97/00* | (2006.01) |
| *C08L 97/02* | (2006.01) |

(52) U.S. Cl.
CPC ................ *B29B 7/92* (2013.01); *C08H 8/00* (2013.01); *C08L 1/02* (2013.01); *C08L 5/14* (2013.01); *C08L 97/005* (2013.01); *C08L 97/02* (2013.01); *C08L 99/00* (2013.01); *C08L 2201/06* (2013.01)

(58) Field of Classification Search
CPC ..... B29B 7/92; C08H 8/00; C08L 1/02; C08L 5/14; C08L 97/005; C08L 97/02; C08L 99/00; C08L 2201/06
USPC .......................................................... 524/13
See application file for complete search history.

(56) References Cited

U.S. PATENT DOCUMENTS

| | | | |
|---|---|---|---|
| 2008/0193506 A1* | 8/2008 | Kristiansen | A23G 4/18 424/440 |
| 2013/0236722 A1* | 9/2013 | Bartkowiak | C09D 5/00 427/256 |
| 2014/0005299 A1* | 1/2014 | Liao | C08K 5/0016 252/609 |

* cited by examiner

*Primary Examiner* — Ruiyun Zhang
(74) *Attorney, Agent, or Firm* — Perkins Coie LLP

(57) ABSTRACT

A method of manufacturing a biodegradable bioplastic includes preparing a plant derived polymer base, preparing bamboo extracts from bamboo wood, and combining the bamboo extracts with the polymer base, optionally by heating and mixing the polymer base in a liquid form together with the bamboo extracts in a liquid form. The bamboo extracts may be applied as a surface treatment of the polymer base, with the polymer base in a solid form. The plant derived polymer base may include water, potassium bicarbonate, glycerol and starch, such as arrowroot. The plant derived polymer base and the bamboo extracts may be combined at ambient temperature, heated, cooled, reheated and recooled and solidified.

12 Claims, No Drawings

COMPOSTABLE BIOPLASTIC AND METHODS OF MANUFACTURE

CROSS-REFERENCE TO RELATED APPLICATION(S)

This application claims priority to and the benefit of U.S. Provisional Application No. 63/292,068, filed Dec. 21, 2021 and U.S. Provisional Application No. 63/353,437, filed Jun. 17, 2022, both incorporated herein by reference.

TECHNICAL FIELD

The invention is directed to durable and compostable bioplastic and methods for making bioplastics.

BACKGROUND

Widespread use of plastics and microplastics has various environmental, public health and climate related disadvantages. Multiple peer-reviewed studies suggest that almost everyone on Earth is consuming a credit card's weight in plastic, about 5 grams, every week, through our air, food, and water, via microplastics. Only about 9% of recyclable waste materials are being recycled. The rest still ends up in landfills or waterways, notwithstanding various urban recycling programs and recycling incentives. In addition, conventional plastic is made from fossil-fuels derived from petroleum or natural gas, so that manufacture of conventional plastic is associated with greenhouse gas emissions.

The term bioplastics generally encompasses plastics that are based on or sourced from plant materials, as opposed to conventional plastics which are largely based on or sourced from fossil fuel materials. Some bioplastics are no more biodegrable than conventional plastics. Other bioplastics are more biodegradable, but are still slow to degrade after disposed of. Bioplastics also have varying durability and structural characteristics, which may tend to limit their uses. Accordingly, improved bioplastic materials and methods of their manufacture are needed.

SUMMARY

In a first aspect, a durable and non-toxic bioplastic is made with ingredients sourced from plants capable of high yields in little time. The plants used as source materials may be climate-resilient, drought-resistant, and need less lumen absorption, and less nutrient-rich soil. These plants are also not tied to deep regulatory constraints like hemp and cannabis are.

In a second aspect, the present bioplastic and methods may be readily used in less developed communities because manufacture of the present bioplastics does not require intensive technology and equipment. Marginal lands previously thought to be unsuitable for agricultural may be used to grow plants useable as a source material for the present bioplastics.

In a third aspect, the present bioplastics may be made in a pellet form, film form or in a 3D printing filament form. The pellet form may be molded into products. The 3D printing filament form may be used in additive manufacturing to make products of virtually any shape.

In a method of the invention, a plant based polymer base may be prepared by combining water; potassium bicarbonate $KCO_2$; glycerol $C_3H_8O_3$ and starch $C_{27}H_{48}O_{20}$, such as Arrowroot. These materials are processed in a heating and mixing sequence and comprise a polymer base. Bamboo extracts may be added during formation of the polymer base to provide a bioplastic having advantageous self-cleaning properties resulting from ultra-hydrophobicity, as well as improved resiliency and durability. The present bioplastic is also highly biodegrable. Alternatively, or in addition, the bamboo extracts may be applied to the polymer base as a surface treatment, such as by spraying, vapor deposition, immersion, etc. The bamboo extracts may be obtained by boiling bamboo wood in water, or via an ethanol extraction process. The bamboo extracts may include cellulose $C_6H_{10}O_5$; hemicellulose/holocellulose $C_5H_{10}O_5$; lignin $C_{81}H_{92}O_{28}$; and $SiO_2$ Fused Silica/Nano Silica.

Other aspects and advantages will become apparent from the following detailed description, which is provided by way of example, and is not intended as a limit on the scope of the invention.

BRIEF DESCRIPTION OF THE DRAWINGS

Detailed Description

A bioplastic material that is highly biodegrable may be manufactured using the following process.

A. Preparing the Polymer Base

A1. A plant based polymer base may be prepared by combining water; potassium bicarbonate $KCO_2$; glycerol $C_3H_8O_3$ and starch $C_{27}H_{48}O_{20}$ (such as Arrowroot) to provide a polymer base liquid. The polymer base liquid, at room or ambient temperature, is placed into a vessel, such as a pot or caldron.

A2. The polymer base liquid is heated to boiling. Once boiling the polymer base liquid is removed from heat to stop the boiling and it is then stirred.

A3. The polymer base liquid is then reheated boiling (to e.g., 275 F). During the reheating step (depending on parameters) the polymer base liquid changes color, generally from a milky white color to a translucent white color.

A4. Bamboo extracts, in liquid form, are contemporaneously added to the polymer base liquid and mixed in along with the other ingredients described above. This occurs before heating, if used.

B. Preparing the Bamboo Extracts

B1. Bamboo wood is suspended in water and rapidly boiled to the point that substantially no further chemicals can be extracted.

B2. The spent bamboo wood is removed. The remaining bamboo extract liquid is filtered to remove debris. The filtered bamboo extract liquid is placed into a container (e.g., glass) and the container which is optionally covered or sealed against contaminants. The bamboo extract liquid is allowed to cool.

B3. The bamboo extract liquid contains the following ingredients:

Molecular to Empirical

| | |
|---|---|
| $C_6H_{10}O_5$—$C_{126}H_{210}O_{105}$ | (Cellulose) |
| $C_5H_{10}O_5$—$C_{110}H_{220}O_{110}$ | (Hemicellulose) |
| $C_{81}H_{92}O_{28}$—$C_{162}H_{184}O_{56}$ | (Lignin) |
| $SiO_2$—$Si_{56}O_{112}$ | (Fused Silica/Nano Silica) |

Other substances may also be present in the bamboo extract liquid.

Ethanol may be used to dry samples faster with the photon initiator, as opposed to samples without the initiator, under dehydration, but made no difference in terms of U.V. light. Samples extracted with ethanol showed faster drying times in air and dehydration, but slows drying in the same samples if the photon initiator is present. The photon initiator works against any other kind of drying, besides U.V. if ethanol is present.

C. Combining the Polymer Base and the Bamboo Extracts

C1. The bamboo extract liquid is measured and combined with the polymer base liquid. For example, the bamboo extract liquid and the polymer base liquid are placed into a room temperature (65F) heating vessel, such as a Teflon pot. The combined liquid is rapidly heated to boiling or near boiling, e.g., 245 to 320 F, or 275-290° F., to completely saturate the polymer base with the bamboo extract liquid.

C2. The combined liquid may also be slowly stirred while heating to help saturate the polymer base. The combined liquid is heated further to a boil and may be simultaneously rapidly stirred. The combined liquid has a milky-white color (from the starch in the polymer base) and begins to turn to a solid.

C3. The combined liquid quickly cooled, optionally with rapid stirring to help in cooling.

C4. The combined liquid is heated again to a rapid boil, causing the combined liquid to change from white to translucent.

C5. The combined liquid is removed from heat to avoid overheating it, which can cause loss of translucence. In many applications translucence is necessary or helpful because it allows the bioplastic end product to be dyed to a desired color.

C6. The combined liquid is cooled, or allowed to cool to ambient temperature, optionally with rapid continued stirring, resulting in the present bioplastic. The combined liquid is poured onto an ambient temperature board or other surface or into a container. Pouring onto a flat surface, such as a board, better avoids air bubbles in the material.

C7. The bioplastic is advantageously cured or hardened. This may be achieved by passive cooling and then allowing the bioplastic to air dry for up to several days, optionally in a container or space protected from contamination. Curing or hardening may be accelerated using active drying, such as with industrial drying equipment, including dehydrators and heating dryers, though active drying may change the form of the end product bioplastic.

C8. After curing or hardening the biopolymer may be provided in bulk form or pellet form for manufacture of end products, such as utensils, containers, flatware, packaging, etc. The bamboo extracts provide the bioplastic with a barrier which helps to stop the bioplastic from absorbing gases or liquids. The bamboo extracts also help to harden the bioplastic and slow down the degrading or disintegration of the material. The bamboo extract derived from boiling it in water, by itself, without any additional ingredients is a natural liquid cleaning agent. It removes baked on plastic and other materials that other cleaners do not. It's a natural oven and grease cleaner as well. Where the bamboo extract is to be used as a cleaning agent, lemon juice or similar ingredients may be added for aromatic purposes, and disinfecting purposes.

C9. As an alternative to adding the bamboo extracts to the polymer base as a liquid, the bamboo extracts may be applied to cured and dried polymer base as a gas or vapor, as a surface treatment, or via nanoparticles. Regardless as to how the bamboo extracts are added to the polymer base, both substances are completely biodegradable.

C10. The methods above may be performed using commonly available ingredients and using simple and commonly available equipment. These same methods can of course also be performed using more specialized or sophisticated equipment to practice the invention on an industrial scale and/or to accelerate or automate manufacture of the present bioplastic.

The Examples below list of base molecular formulas and empirical formula's based on weight of samples, their percent composition and weights:

EXAMPLE 1

Strain #4 Created Mar. 4, 2021 (86.164278 Grams)

Molecular to Empirical:

A. Polymer Ingredients (in Liquid Form Except for the Starch and Available from Commercial Sources):

| | |
|---|---|
| $H_2O$—$H_{372}O_{186}$ | water |
| $KCO_2$—$K_{40}C_{40}O_{80}$ | potassium bicarbonate -- potassium oxalate |
| $C_3H_8O_3$—$C_{108}H_{288}O_{108}$ | glycerol |
| $C_{27}H_{48}O_{20}$—$C_{135}H_{240}O_{300}$ | cassava |

B. Bamboo Ingredients (Extracts from Boiling Bamboo):

| | |
|---|---|
| $C_6H_{10}O_5$—$C_{126}H_{210}O_{105}$ | cellulose |
| $C_5H_{10}O_5$—$C_{110}H_{220}O_{110}$ | hemicellulose/holocellulose) |
| $C_{81}H_{92}O_{28}$—$C_{162}H_{184}O_{56}$ | lignin |
| $SiO_2$—$Si_{56}O_{112}$ | silicon dioxide |

Percent BY WEIGHT Composition:

| | |
|---|---|
| $H_2O$—$H_{372}O_{186}$ = | 70.794999291934% |
| $KCO_2$—$K_{40}C_{40}O_{80}$ = | 3.4817212766525% |
| $C_3H_8O_3$—$C_{108}H_{288}O_{108}$ = | 1.1605737588842% |
| $C_{27}H_{48}O_{20}$—$C_{135}H_{240}O_{300}$ = | 22.241558154761% |
| $C_6H_{10}O_5$—$C_{126}H_{210}O_{105}$ = | 1.0394872292669% |
| $C_5H_{10}O_5$—$C_{110}H_{220}O_{110}$ = | 0.69131510160162% |
| $C_{81}H_{92}O_{28}$—$C_{162}H_{184}O_{56}$ = | 0.5752577257132% |
| $SiO_2$—$Si_{56}O_{112}$ = | 0.015087482076969% |

This bioplastic appears to be well suited for as a film for single-use products.

EXAMPLE 2

Strain #9 Created Mar. 4, 2021 (120.34 Grams)

Molecular to Empirical:

| |
|---|
| $H_2O$—$H_{372}O_{186}$ |
| $KCO_2$—$K_{40}C_{40}O_{80}$ |
| $C_3H_8O_3$—$C_{108}H_{288}O_{108}$ |
| $C_{27}H_{48}O_{20}$—$C_{135}H_{240}O_{300}$ |
| $C_6H_{10}O_5$—$C_{110}H_{220}O_{110}$ |
| $C_5H_{10}O_5$—$C_{110}H_{220}O_{110}$ |
| $C_{81}H_{92}O_{28}$—$C_{162}H_{184}O_{56}$ |
| $SiO_2$—$Si_{56}O_{112}$ |

Percent Composition:

| | |
|---|---|
| $H_2O$—$H_{372}O_{186}$ = | 50.689712481303% |
| $KCO_2$—$K_{40}C_{40}O_{80}$ = | 7.478810038225% |
| $C_3H_8O_3$—$C_{108}H_{288}O_{108}$ = | 2.4929366794083% |
| $C_{27}H_{48}O_{20}$—$C_{135}H_{240}O_{300}$ = | 37.676583014791% |
| $C_6H_{10}O_5$—$C_{126}H_{210}O_{105}$ = | 0.74428009473159% |
| $C_5H_{10}O_5$—$C_{110}H_{220}O_{110}$ = | 0.49498642679076% |

-continued

| | |
|---|---|
| C81H92O28—C162H184O56 = | 0.41188853747715% |
| SiO2—Si56O112 = | 0.010802742230347% |
| =100% of compound | |

EXAMPLE 3

Strain #10 Created Mar. 4, 2021 (269.447 Grams)

Molecular to Empirical:

H2O—H372O186
KCO2—K40C40O80
C3H8O3—C108H288O108
C27H48O20—C135H240O300
C6H10O5—C126H210O105
C5H10O5—C110H220O110
C81H92O28—C162H184O56
SiO2—Si56O112

Percent Composition:

| | |
|---|---|
| H2O—H372O186 = | 22.638960537694% |
| KCO2—K40C40O80 = | 0.37113050061793% |
| C3H8O3—C108H288O108 = | 2.5979135043255% |
| C27H48O20—C135H240O300 = | 73.649734456127% |
| C6H10O5—C126H210O105 = | 0.33240921813937% |
| C5H10O5—C110H220O110 = | 0.22107006795399% |
| C81H92O28—C162H184O56 = | 0.1839570178922% |
| SiO2—Si56O112 = | 0.0048247039306431% |

This bioplastic is well suited for use in machine and prototype plastic part products, and also as a pelleted plastic.

EXAMPLE 4

Apr. 15, 2022

In this example polymer was extracted from bamboo using the following steps:
1. Pieces of bamboo were submerged in ethanol in a container.
2. The container holding the submerged bamboo and ethanol were then cooled in a freezer, at a temperature below 0° C., but above the freezing temperature of ethanol, so that the ethanol does not solidify. Cooling aids in the extraction process. The container may be placed in the freezer for 24 to 48 hours.
3. The container was removed from the freezer the pieces of bamboo removed, leaving the ethanol and bamboo extract mixture in the container. The mixture was then filtered.
4. The ethanol is then removed from mixture, leaving the bamboo extract. In this example the ethanol was evaporated away. Specifically, the mixture was placed in a vacuum rolling flask, attached to a high pressure air apparatus. The rolling motion and high pressure air separated the ethanol from the bamboo extract, (in a day long process). Low-level heat may be added to reduce the time it takes to evaporate the ethanol, but heating is not necessary.
5. The bamboo extract left after the ethanol is removed was a green liquid oil substance.

Additional samples of bamboo were gathered in Calistoga California, early April of 2022 and were cut into small pieces. Half were submerged into 30 oz of 190 proof, 95% ethanol made by Belle Chemical, on Apr. 10, 2022. The container was put into a freezer for 70 hours. Weight of bamboo and ethanol: 787.32 grams.

On Apr. 13, 2022 the container was removed, as was all of the bamboo from the container, via filtration, leaving 525 mL of ethanol and the liquid form pure extraction of bamboo and ethanol.

The bamboo consisted of:
1. 25% of (Lignin C81H92O28) 1513.6 g/mol. A cross-linked phenolic polymer mainly comprised of three constituent monomers:
   a.) p-hydroxyphenal (4-hydroxyphenal, P)
   b.) guaiacyl (4-hydroxy-3-methoxyphenyl, G)
   c.) Syringly (4-hydroxy-3, 5-dimethoxyphenyl, S)
2.) 30% of both Holocellulose (Defined as the total polysaccharide fraction of lignocellulosic biomass which is composed and all of the hemicelluloses (water insoluble carbohydrate) fraction of wood materials))) & Hemicellulose (C5H10O5) Molar mass: 173.09 g/mol
3.) 44.35% Cellulose (C6H10O5) Molar mass: 162.1406 g/mol
4.) 0.65% SiO2 (60.08 g/mol)→Si(OH)4 (96.113 g/mol) (Silicon dioxide)→Silicon hydroxide The ethanol used was (C2H5OH) 190 proof, (95%). To extract the ethanol from the purified extraction of bamboo, the 525 mL was poured into an E-lab side arm vacuum flask, with a cork stopper with drilled hole in its top. A high-pressure air supply was then attached to the top at 6:04 pm, and low level heat, via a dryer at 7:18 pm. Ethanol was evaporated via low-level heat and air supply pressure. Final result at 10:45 pm was a weight of 13.88 oz of extracted purified bamboo and ethanol, which was placed in an air tight, glass container to be used later.

On Apr. 15, 2022, the second half of the bamboo was extracted, weighing 152 grams, via boiling in H20. Flame temperature was 500 degrees. H2O boil temperature was 125 degrees, rendering 27.38 oz of H20 and liquid bamboo. The liquid was placed into an air tight container to be used later.

EXAMPLE 5

Apr. 23, 2022

Strain #10 disclosed in Example 3 was made with bamboo extracted with ethanol and then separately by boiling water, and modified also by adding a flame retardant in one set of samples, a photon initiator in a second set of samples, and both a photon initiator and flame retardant in a third set of samples.

Original Formula for #10:
1. Bamboo extract+H20
2. H20
3. KCO2
4. C3H8O3
5. Root Second Formula #10A: (Modified #10)
1. Bamboo extract+C2H6O or CH$_3$CH$_2$OH
2. H20
3. KCO2
4. C3H8O3
5. Root The following were added to the #10A formula with the bamboo in the liquid state:
1.) A photon initiator: Liquid (Sublingual) B-12 2000 MCG with B-Complex or a high concentration of B-12 alone.

Chemical composition using the B-Complex was:
 a.) B-12 83,333% (As Cyanocobalamin)
 b.) B-1 (4 mg) 333%
 c.) Riboflavin (4 mg) 308%
 d.) Niacin (20 mg) 125%
 e.) B-6 (10 mg) 588%
 f.) Folate (333 mcg DFE+200 mcg Folic Acid) 83%
 g.) Biotin (300 mcg) 1000%
 h.) Pantothenic Acid (30 mg) 600%

2.) A flame retardant: Tannic Acid $C_7H_{52}O_{46}$ Reagent, ACS (in this case a powder form diluted in water) EXP: January 2024.
 A liquid form tannic acid may also be used. Adding tannic acid integrated into the polymer avoided sparking. The polymer would burn after an interval but not explosively. With the flame retardant the polymer turns to ash. It will burn but it does not explode or spark even under flame. Tannic acid is natural and non-toxic flame retardant. The tannic acid may be added when the polymer is a liquid before it is heated. The photo initiator may also be added as a liquid before heating the polymer.

Experimental Results:

1.) The photon initiator, in Examples 1-3 made with bamboo, extracted via boiling in water, showed drying under UV light. Conversely, and surprisingly, the samples made with same initiator showed no difference to drying as opposed to those samples made without an initiator. On the other hand, samples made with the bamboo extracted using ethanol, with and without an initiator, were placed into a dehydration machine at 105 degrees F., and the samples without an initiator dried much faster. The initiator works against drying in all ethanol extraction samples.

2.) The flame retardant (Tannic acid $C_7H_{52}O_{46}$) worked well in all sample species, both in the bamboo extracted via boiling in water and the ethanol process. The original samples of examples 1-3 without flame retardant sparked when a flame of over 500 degrees was placed on the material. These #10A samples had no indication of sparks on both quick flame to material tests and long burn tests. The samples would not hold a flame and eventually under high flame to material would turn to ash. Some smoldering did occur during that process but was very short lived.

3.) Drying: Experimental Results
 A. Dehydration at 105 degrees F. speeds drying times into hours, not days.
 B. Using a photon initiator works if bamboo extraction is done via high heat boiling in H2O, if U.V. light is used.
 C. Using very condensed high heat, via 300 4095-BTU Heat Gun will dry the polymer, BUT it changes the materials shape (cocooning) and is too intense for biobased plastics, and is not recommended.
 D. Though using a heat gun to dry is not recommended, with the introduction of a flame retardant even those intensified heats did not cause the polymer to spark or explode.

In the boiling method described above, cellulose; hemicellulose; lignin; and fused silica/nano silica are extracted from the bamboo wood and suspended in water. These natural chemicals create a so-called Lotus Effect within the bioplastic material. The Lotus effect refers to self-cleaning properties that are a result of ultra-hydrophobicity as exhibited by the leaves of Nelumbo, the lotus flower. Dirt particles are picked up by water droplets due to the micro- and nanoscopic architecture on the surface, which minimizes the droplet's adhesion to that surface.

In the examples above, the Lotus Effect causing chemicals are distributed throughout the bioplastic. Alternatively, these chemicals may be condensed into a gas and sprayed onto the surface of the bioplastic material. This step slows decomposition and creates a stronger barrier over a longer time for parts that are exposed to liquids.

The bioplastic materials described above may be highly flammable. A fire-retardant may be added to reduce flammability. For example, tannic acid may be added as a fire retardant, while also keeping the bioplastic non-toxic and biodegradable. Alternative flame retardants include aluminum hydroxide nano-$Al(OH)_3$ and alumina trihydrate ($Al_2O_3 \cdot 3H_2O$), with micro or nano particle size; mineral-hydrated fillers such as aluminum tri-hydroxide (ATH) and magnesium hydroxide ($Mg(OH)_2$; and/or phosphorous-based intumescent flame retardants. Surface treatments, including use of nano particles, may also be used. Of course, in selecting the fire retardant, biodegradability and loading concentration must be considered.

The bioplastics described above may be provided as a 3D print filament. Large scale additive manufacturing may use UV light to harden layers of filament plastic into a desired shape. In this case the present bioplastic includes a photo initiator. In some cases riboflavin (vitamin B12) and/or triethanolamine (TEOHA), may be used as a photo initiator.

Other photon initiators (B1, B6, B12, Riboflavin, Niacin, Biotin, Folate, & pantothenic acid) may be added to the bamboo extract prepared via boiling, which shows faster drying times under U.V. light, as opposed to samples without the initiator added. Neither the flame retardant nor the initiator changed the chemistry of original samples, however the initiator made no difference in the bamboo extracted by ethanol.

The addition of a plasticizer, such as sucrose, Ethylene-glycol, or additional glycerin may be added to strengthen the plastic further. Sucrose (e.g., $C_{12}H_{22}O_{11}$) enhances tensile strength. Cellulose, lignin, hemicellulose, holocellulose, and/or (nano silica or silica) may also be added for the same purpose. These or other plasticizers may be added to the bioplastic in different proportions depending on the end-product. A purer form of cellulose may be used to increase tensile strength.

PVA (Polyvinyl acetate) may be added to slow water absorption, increase tensile strength, and/or to extend the products life cycle in some end-products. The bioplastics described may be used as a binder with the addition of Graphene-oxide and various nano zinc ferrite (NZF) nanoparticles as a coating to block broadband adsorption in some products, for example, when used as an insulating material on wires and cables. Graphene-oxide may also be added to some end-products to block water absorption and to lengthen life cycles.

part from bamboo, other plants may be used, including drought resistant and high-yield plants. Such plants may optionally be farmed vertically, indoors or outdoors.

After six months of full submersion in water (at 50 F) examples of the durable bioplastic described above start to breakdown, while maintaining their resiliency. This is without industrialized compression of the plastic. At much colder temperatures with compression, it may take a year or more for breakdown, but it will break down, and if ingested it will not poison its host.

Different strains of bamboo can be used. Although they vary in percent composition, all bamboo strains contain the same chemicals. Bamboo is renewable. It grows very quickly. It has the highest SiO2 content of any wood on the planet. For some applications, extracts of other woods may be used.

In an alternative embodiment, a method for making a wood extract includes placing wood, such as bamboo in a solvent, such as alcohol, in a container, cooling the contents of the container to at a temperature below 0° C., but above the freezing temperature of the solvent, the solvent extracting wood extract from the wood, providing a solvent/wood extract mixture, removing the wood from the solvent, and at least partially removing the solvent from the solvent/wood extract mixture to provide the wood extract. The solvent/wood extract mixture may be filtered and the solvent removed by heating and evaporation. The contents of the container may be at a temperature below 0° C., but above the freezing temperature of the solvent, for 24 to 48 hours.

Another method for making a bioplastic material includes combining the wood extract made as described above with a plant derived polymer base comprising water; potassium bicarbonate; glycerol and starch, heating the combined bamboo extracts and plant derived polymer base, cooling the mixture, and drying the mixture to provide a solid bioplastic material.

A method of making a cleaning product may include boiling bamboo wood in water, removing the bamboo from water, allowing the water to cool, and filtering the water, which may contain cellulose, hemicellulose, lignin and silica.

As used here:
plant based or plant derived means at least 90% of the material by weight is plant material;
potassium bicarbonate means KHCO3; potassium oxalate KCO2 may also be used;
glycerol means glycerol or glycerin;
drying means actively drying or allowing to passively dry;
cooling means either actively cooling, or just removing from heat and allowing to passively cool.

Thus, novel bioplastics and processes have been described. Various changes and substitutions may of course be made without departing from the spirit and scope of the invention. The invention, therefore, should not be limited, except to the following claims and their equivalents.

The invention claimed is:

1. A material, comprising:
a biodegrable plastic including a polymer base comprising starch; potassium bicarbonate; glycerol; and
bamboo extracts dispersed into the polymer base.

2. The material of claim 1 wherein the bamboo extracts are mixed into the polymer base during manufacture.

3. The material of claim 1 further comprising a fire retardant.

4. The material of claim 3 wherein the fire retardant comprises a member selected from the group consisting of: tannic acid; aluminum hydroxide and/or alumina trihydrate particles; mineral-hydrated fillers; phosphorous-based intumescent flame retardants; and combinations thereof.

5. The material of claim 1 wherein the bamboo extracts include water, cellulose, hemicellulose, lignin and fused silica and/or nano silica.

6. A material, comprising a biodegrable plastic including a polymer base comprising starch; potassium bicarbonate; glycerol; and a photo-initiator.

7. The material of claim 6 wherein the photo-initiator comprises a member selected from the group consisting of: riboflavin (vitamin B12); triethanolamine (TEOHA), vitamin B1 (thiamin), vitamin B6 (Pyridoxine), Niacin, Biotin, Folate, pantothenic acid, and a combination thereof.

8. A biodegradable bioplastic material, comprising:
a plant-derived liquid-form polymer base comprising starch; potassium bicarbonate; and glycerol; combined with bamboo extracts from bamboo wood, the bamboo extracts comprising water, cellulose, hemicellulose, lignin and fused silica and/or nano silica.

9. The material of claim 8 wherein the plant-derived liquid-form polymer base further comprises water.

10. The material of claim 8 wherein the starch comprises cassava-based starch.

11. The material of claim 8 further including a fire retardant comprising a member selected from the group consisting of: tannic acid; aluminum hydroxide and/or alumina trihydrate particles; mineral-hydrated fillers; phosphorous-based intumescent flame retardants; and combinations thereof.

12. The material of claim 8 further comprising a photo-initiator.

* * * * *